United States Patent
De Nagy Koves Hrabar et al.

(10) Patent No.: US 10,159,088 B1
(45) Date of Patent: *Dec. 18, 2018

(54) TRANSFERRING DATA THROUGH A BONDED COMMUNICATION LINK

(71) Applicant: Olaeris, Inc., Fort Worth, TX (US)

(72) Inventors: Stefan E. De Nagy Koves Hrabar, Chapel Hill (AU); Edward Lindsley, Burleson, TX (US)

(73) Assignee: Sqwaq, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,499

(22) Filed: Oct. 2, 2017

Related U.S. Application Data

(63) Continuation of application No. 14/671,009, filed on Mar. 27, 2015, now Pat. No. 9,801,201.

(60) Provisional application No. 61/976,045, filed on Apr. 7, 2014.

(51) Int. Cl.
*H04W 72/12* (2009.01)

(52) U.S. Cl.
CPC .............................. *H04W 72/1242* (2013.01)

(58) Field of Classification Search
CPC .............. H04W 72/1242; H04W 88/04; H04B 7/18582; H04L 47/10; H04L 49/90
See application file for complete search history.

(56) References Cited

U.S. PATENT DOCUMENTS

| | | | |
|---|---|---|---|
| 8,155,158 B2 | 4/2012 | Saavedra | |
| 8,717,885 B2 | 5/2014 | Arisoylu et al. | |
| 9,201,835 B2 | 12/2015 | Akin et al. | |
| 9,313,667 B1 | 4/2016 | Daoura | |
| 9,651,944 B2 | 5/2017 | Arwine | |
| 9,688,401 B2 | 6/2017 | Hester et al. | |
| 2003/0035371 A1 | 2/2003 | Reed et al. | |
| 2005/0251579 A1 | 11/2005 | Ngo et al. | |
| 2006/0149851 A1* | 7/2006 | Matsumoto | H04L 45/00 709/238 |
| 2006/0176861 A1 | 8/2006 | Schmidt | |

(Continued)

OTHER PUBLICATIONS

"Non-Final Office Action Issued in U.S Appl. No. 15/493,155", dated Nov. 16, 2017, 14 Pages.

(Continued)

*Primary Examiner* — Anez Ebrahim
(74) *Attorney, Agent, or Firm* — Michael B. Dodd; Dodd Law Group

(57) ABSTRACT

The present invention extends to methods, systems, devices, apparatus, and computer program products for transferring data through a bonded communication link. A bonded communication link bonds together capabilities from each of a plurality of other communication links to form a higher bandwidth communication link relative to each of the plurality of other communication links considered separately. Link qualities can be monitored for each of the plurality of other communication links. Different priorities can be assigned to different types of data. Based on monitored link qualities and assigned data priorities, different data types can be routed via different of the other communication links. Routing different data types via different of the other communication links facilitates selective transmission of higher priority data when quality degrades on a communication link.

17 Claims, 2 Drawing Sheets

(56) References Cited

U.S. PATENT DOCUMENTS

| | | |
|---|---|---|
| 2007/0297416 A1 | 12/2007 | Boley et al. |
| 2008/0033604 A1 | 2/2008 | Margolin |
| 2008/0130668 A1 | 6/2008 | Balakrishnan et al. |
| 2008/0253282 A1 | 10/2008 | Kissel |
| 2008/0267181 A1 | 10/2008 | Monga et al. |
| 2009/0069957 A1* | 3/2009 | Nakamura ............ B64C 39/024 701/3 |
| 2010/0015972 A1* | 1/2010 | Hong ................ H04B 7/18563 455/428 |
| 2010/0234071 A1* | 9/2010 | Shabtay ............... H04B 7/0408 455/562.1 |
| 2010/0302359 A1 | 12/2010 | Adams et al. |
| 2011/0149849 A1 | 6/2011 | Brownrig |
| 2012/0170523 A1 | 7/2012 | Civanlar |
| 2012/0327847 A1* | 12/2012 | Rundquist .......... H04B 7/18582 370/316 |
| 2014/0247721 A1 | 9/2014 | Arisoylu et al. |
| 2015/0078332 A1 | 3/2015 | Sidhu et al. |
| 2015/0168144 A1 | 6/2015 | Barton et al. |
| 2016/0006695 A1 | 1/2016 | Prodoehl et al. |
| 2016/0328979 A1 | 11/2016 | Postrel |

OTHER PUBLICATIONS

"Final Office Action Issued in U.S Appl. No. 15/493,155", dated Dec. 5, 2017, 20 pages.

"Non-Final Office Action Issued in U.S Appl. No. 14/671,009", dated Jan. 17, 2017, 17 Pages.

"Non-Final Office Action Issued in U.S Appl. No. 14/671,009", dated Jul. 11, 2017, 22 Pages.

"Notice of Allowance Issued in U.S Appl. No. 14/671,009", dated Sep. 14, 2017, 7 Pages.

"Cellular Bonding", Dr. Rony Ohayon and Baruch Altman, TVTechnology, Feb. 1, 2012, 3 pages. https://www.tvtechnology.com/expertise/cellular-bonding.

"Ocean Vessel WiFi—VSAT and Cellular Bonding", Wei Ming, Apr. 2, 2014, 2 pages. https://forum.peplink.com/t/ocean-vessel-wi-fi-vsat-and-cellular-bonding/2532.

"Non-Final Office Action Issued in U.S. Appl. No. 15/493,155", dated May 21, 2018, 16 Pages.

* cited by examiner

TRANSFERRING DATA THROUGH A BONDED COMMUNICATION LINK

CROSS-REFERENCE TO RELATED APPLICATIONS

This application is a continuation of and claims the benefit of and priority to U.S. patent application Ser. No. 14/671,009, entitled "Prioritized Transmission Of Different Data Types Over Bonded Communication Channels", filed Mar. 27, 2015 by Stefan E. De Nagy Koves Hrabar et al., the entire contents of which are expressly incorporated by reference. That application claims the benefit of and priority to U.S. Provisional Patent Application Ser. No. 61/976,045 entitled "Prioritized Transmission Of Different Data Types Over Bonded Communication Channels", filed Apr. 7, 2014 by Stefan E. De Nagy Koves Hrabar, the entire contents of which are expressly incorporated by reference.

BACKGROUND

1. Background and Relevant Art

Bonding of mobile cellular network links refers to the process of combining the bandwidth of multiple individual links (individual modems) to produce a single high-bandwidth link. For example, multiple 3G or 4G links can be bonded together to provide solutions for transferring data with increased bandwidth requirements, such as, video. Typical bonding solutions are designed to broadcast a single video stream, or general IP data.

However, many environments require reliable, low-latency, high-bandwidth communications link for transmitting a variety of different types of data. For example, unmanned aerial vehicles (UAVs) fitted with a surveillance cameras can require a reliable, low-latency, high-bandwidth communications link for transmitting both video and telemetry data to a ground-based operator and for receiving commands from the ground-based operator. Telemetry data is used to monitor the state of the aircraft and commands are used to control vehicle operation. As such, both the telemetry data and commands are mission-critical, and interruptions to either could result in a loss of the aircraft. Interruptions to the surveillance video data from the onboard camera would not endanger the operation of the aircraft however.

Unfortunately, conventional bonding solutions can rely on separate, un-bonded radio-based links for transmitting video and telemetry data from the aircraft to the ground, and command data from the ground to the aircraft. Thus, if a channel for telemetry and/or commands is malfunctioning and another channel for video is operational and/or has available bandwidth, there may be no way to make use of the other channel for telemetry data and/commands. If the malfunction is significant, an aircraft could potentially be lost even though a functioning communication channel exists.

BRIEF SUMMARY

The present invention extends to methods, systems, devices, apparatus, and computer program products for transferring data through a bonded communication link. A bonded communication link bonds together capabilities from each of a plurality of other communication links to form a higher bandwidth communication link relative to each of the plurality of other communication links considered separately.

A first data type and a second data type are identified in data (e.g., data to be sent from one device to another device). A first priority is assigned to the first data type based on a data type prioritization scheme. A second priority is assigned to the second data type based on the data type prioritization scheme. A link quality for each of the plurality of communication links, including a first link quality for first communication link and a second link quality for a second communication, is monitored.

The first communication link and the second communication link are selected to transfer the data based on the first link quality and the second link quality and at least one of: the first priority or the second priority. The data is routed through the bonded communication link based on the first link quality, the second link quality, the first priority, and the second priority. Routing the data through the bonded communication link includes routing data of the first data type via the first communication link and routing data of the second data type via the second communication link.

In one aspect, higher priority data is routed via communication links having relatively better link quality.

In another aspect, monitoring link quality for each of the plurality of communication links includes monitoring a third link quality of a third communication link. The third communication link is bonded together along with the first communication link and the second communication link in the bonded communication link. Data is not routed over the third communication link based on the third link quality. Alternatively, routing is adjusted from routing data over the third communication to routing the data over a different communication link based on the third link quality.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

The specific features, aspects and advantages of the present invention will become better understood with regard to the following description and accompanying drawings where.

DETAILED DESCRIPTION

Figure 1:
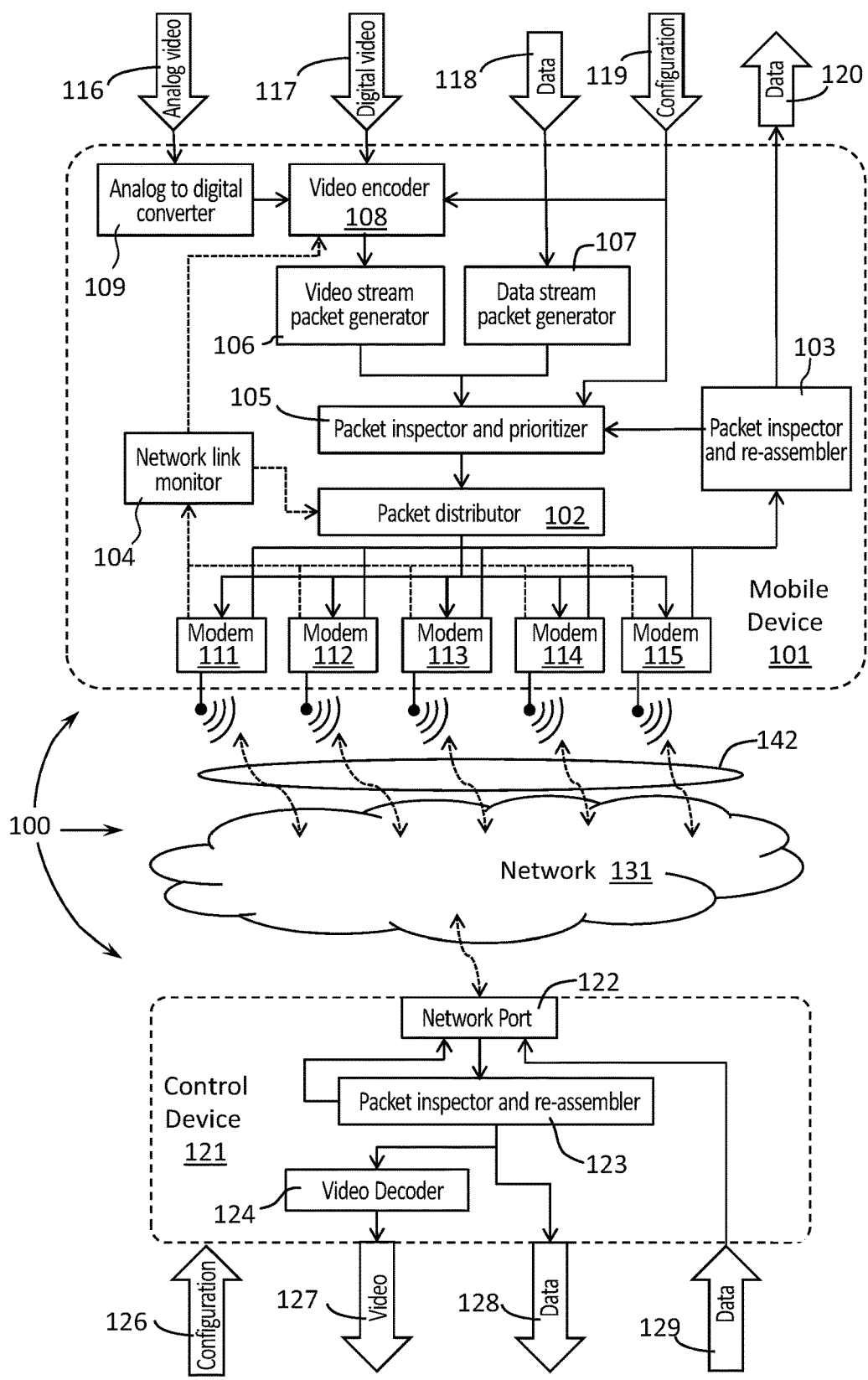
FIG. 1 illustrates an example architecture that facilitates prioritized transmission of different data types over bonded communication modules.

The present invention extends to methods, systems, devices, apparatus, and computer program products for prioritized transmission of different data types over bonded communication modules. Embodiments of the invention include a portable (and potentially mobile and/or remotely operated) device for wirelessly transmitting and receiving various data types over a bonded mobile network and a control device (which can be fixed or portable) capable of receiving data transmitted from the mobile node and transmitting data to it.

The portable device is user-configurable, allowing different input data types to be assigned different priorities. It is able to selectively transmit high-priority data such that lower priority data is sacrificed first in the event of degraded quality of the network link. Quality degradation may be in terms of reduced signal strength, reduced bandwidth or increased latency of the bonded link as a whole, or of one or more of the individual links that are bonded.

Communication between the portable device and control device can be via a cellular or other wireless network. The control device includes a (e.g., Internet Protocol (IP)) network port providing a connection to the cellular or other wireless network. The port is able to re-assemble data streams (e.g., IP packets) received from the portable device and generate output data streams corresponding to the portable device input data sources. Both the portable device and the control device include the ability to detect missing data packets and request packet resends.

In some aspects, different types of data are communicated between a remotely operated vehicle (e.g., an unmanned aerial vehicle (UAV)) and a control station (e.g., where a pilot remotely controls the UAV) over bonded communication modules. Data transmission can be essentially simultaneous with each data type assigned a different priority.

For example, video from cameras mounted to a vehicle (e.g., a UAV) and telemetry data indicating the status of vehicle systems can be essentially simultaneously transmitted from the vehicle to a control station. Command data for controlling the vehicle can also be essentially simultaneously received at the vehicle from the control station. The video, telemetry data, and command data can be transferred over bonded communication channels (e.g., from among 3G cellular, 4G cellular, satellite, Wi-Fi, WiMAX, etc.) at the vehicle.

Telemetry data and command data can have increased mission importance relative to video. Failure to transmit telemetry data and/or receive command data could cause the control of the vehicle to be lost. For example, for a UAV, losing ground-to-aircraft command data could result in total loss of the UAV. On the other hand, interruption of a video stream would not adversely affect the integrity of the vehicle. Thus, telemetry data and command data can be given higher priority relative to video. In the event of a malfunction or degraded quality of a link, video and other lower priority data can be sacrificed to increase the chances of telemetry data and/or command data being appropriately transferred.

FIG. 1 is an example architecture 100 that facilitates prioritized transmission of different data types over bonded communication modules. As depicted, architecture 100 includes mobile device 101 (e.g., at, integrated with, and/or attached to a vehicle), control device 121, and network 131 (e.g., a cellular network). Mobile device 101 includes packet distributor 102, packet inspector and re-assembler 103, network link monitor 104, packet inspector and prioritizer 105, video stream packet generator 106, data stream packet generator 107, video encoder 108, analog to digital converter 109, and modems 111, 112, 113, 114, and 115, and a number of corresponding antennas (not shown). The individual bandwidth provided by each of modems 111, 112, 113, 114, and 115 can be bonded into bonded link 142.

Packet distributor 102 is configured to inspect headers of incoming data (e.g., Internet Protocol (IP) packets) to establish their priority. Based on priority and a packet distribution scheme, packet distributor 102 routes packets to individual modems from among modems 111, 112, 113, 114, and 115 taking into account modem link qualities.

Packet inspector and re-assembler 103 is configured to receive data (e.g., IP packets) from modems 111, 112, 113, 114, and 115 and place them in a buffer. Packet inspector and re-assembler 103 can search the buffer for the next packet in the sequence based on the packet sequence numbers. If a packet is still missing after a timeout, a resend request is sent with higher priority. Once the next packet in the sequence has been found it is output via the data output port 120.

Network link monitor 104 is configured to monitor the link quality of each of modems 111, 112, 113, 114, and 115. Network link monitor 104 can send monitored link quality information to other modules of mobile device 101.

Packet inspector and prioritizer 105 is configured to inspect headers of incoming data (e.g., IP packets) to establish a data type. A data type can be, for example, one of one or more different types of data, video, or audio. Using a data type prioritizing scheme and data type priorities provided via configuration input, packet inspector and prioritizer 105 can insert a priority identifier in each (e.g., IP packet) header.

Video stream packet generator 106 takes an encoded video stream and breaks it up into a sequence of (e.g., IP) packets. Video stream packet generator 106 can insert a label in each packet header to identify it as a video stream packet. Video stream packet generator 106 can also insert a packet sequence number in the header to allow re-assembling packets in the correct order once received by the receiver.

Data stream packet generator 107 is configured to take an input data stream and breaks it up into a sequence of (e.g., IP) packets. Data stream packet generator 107 can insert a label in each packet header to identify it as a data packet. In some embodiments, different labels are also used to distinguish between different types of data, such as, for example, operational data, status data, etc. Different types of data can come from different systems (e.g., at, integrated with, and/or attached to the same vehicle as mobile device 101). Different types of data can include power data (e.g., battery status), engine data, environmental data (e.g., temperature, altitude, direction, etc.), etc.

Video encoder 108 is configured to encode a digital video stream into a lower bitrate format by employing a compression algorithm (such as H.264). A target bitrate can be specified via configuration input. The degree of compression can be varied based on feedback from the network link monitor 104, so that the bitrate is adjusted to correspond to available bandwidth of bonded link 142.

Analog to digital converter 106 is configured to covert analog video to digital video for processing at video encoder 108.

In some embodiments, mobile device 101 also includes one or separate audio input channels (analog and/or digital). In these embodiments, mobile device 101 also includes appropriate components for converting analog audio to digital audio, encoding a digital audio stream, and breaking an audio stream into a sequence of packets.

Accordingly, mobile device 101 can be connected to and exchange data with other co-located (e.g., vehicle) systems. For example, analog to digital converter 109 can receive analog video from analog video input 116. Analog video can be captured at analog cameras (e.g., at, integrated with, and/or attached to the same vehicle as mobile device 101). Video encoder 108 can receive digital video from digital video input 117. Digital video can be captured at digital cameras (e.g., at, integrated with, and/or attached to the same vehicle as mobile device 101). Analog to digital converter 109 can convert analog video into digital video. Video encoder 108 can encode digital video and converted analog video into a video stream.

Alternately or in combination, analog and/or digital audio can be captured at condensers (e.g., at, integrated with, and/or attached to the same vehicle as mobile device 101). An audio encoder can encode digital audio and converted analog audio into an audio stream.

Data stream packet generator 107 can receive data (e.g., telemetry data of different data types) from data input 118. Data can originate at other (e.g., vehicle) systems (e.g., at, integrated with, and/or attached to the same vehicle as mobile device 101). Data stream packet generator 107 can turn data 118 into a data stream. Packet inspector and prioritizer 105 can receive configuration (e.g., telemetry data of different data types) from device configuration input 119. Configuration can indicate the configuration of other (e.g., vehicle) systems (e.g., at, integrated with, and/or attached to the same vehicle as mobile device 101).

Packet inspector and re-assembler 103 can receive data (e.g., IP packets) from modems 111, 112, 113, 114, and 115 and formulate data (e.g., commands) to output at data output 120. Data can be output to other (e.g., vehicle) systems (e.g., at, integrated with, and/or attached to the same vehicle as mobile device 101) to give commands to those other systems.

As depicted, control device 121 includes network port 122 (e.g., a wired connection), inspector and re-assembler 123, and video decoder 124.

Inspector and re-assembler 123 is configured to receive data (e.g., IP packets) from network 131 through network port 122. Inspector and re-assembler 123 can sort data into buffers based on data type. A data type can be, for example, one of one or more different types of data, video, or audio. Inspector and re-assembler 123 searches each buffer for the next packet in the sequence of that data type based on the packet sequence numbers. If a packet is still missing after a timeout, a resend request is sent. Once the next packet in the sequence has been found for a packet type, it is output to the appropriate stream. Video data can be output to the Video Decoder module, while data packets are output to the data output port 128.

Video decoder 124 is configured to decode video data (e.g., packets) into a digital video stream. Video decoder 124 can output a digital video stream at video output 127.

When appropriate, control device 121 can also include an audio decoder to decode audio data (e.g., packets) into a digital audio stream and output the digital audio stream at an audio output port.

Data output at data output port 128, digital video stream data output at video output 127, and an audio data stream output at an audio output port can be presented at one or more output devices, for example, a display screen and speakers, associated with control device 121. Control device 121 can also receive configuration and data (e.g., commands for controlling a vehicle, such as, a, UAV or other Remotely Piloted Aircraft (RPA) through configuration input port 126 and data input port 129 respectively. Configuration input port 126 and data input port 129 can be connected to one or more input devices (e.g., vehicle control devices, such as, flight control devices) associated with control device 121. Input devices can include keyboards, mice, flight sticks, etc. manned, for example, by a vehicle operator (e.g., pilot).

Thus, generally, mobile device 101 can transmit one or more of audio, video and telemetry data over network 131 to control device 121. Control device 121 can receive one or more of audio, video and telemetry data over network 131 from mobile device 101. Similarly, control device 121 can send command data to mobile device 101 over network 131. Mobile device 101 can receive command data over network 131 from control device 121.

For example, in some embodiments, mobile device 101 is included in an unmanned aerial vehicle (UAV) and control device 121 is a remote piloting station for piloting the UAV. As such, the UAV can be considered a Remotely Piloted Aircraft (RPA).

A packet distribution scheme can be used to distribute data (e.g., IP packets). The packet distribution scheme minimizes disruption in transmission of higher priority data types when the signal quality degrades. Any of a variety of different schemes for distributing data (e.g., IP packets) between individual modems (e.g., from among modules 111, 112, 113, 114, and 115) based on their priority can be used.

In one embodiment, network link monitor 104 can establish which modem(s) have the best link quality, and the high priority packets could be routed via these modem(s). For example, when mobile device 101 is at, integrated with, and/or attached to a UAV, a modem with higher (or even the best) link quality can be used exclusively for telemetry data or exclusively for certain types of telemetry data.

In another embodiment, higher priority packets can be routed via a plurality of (and possible all) modems and given a higher priority. Having higher priority, available bandwidth is allocated first to these packets. Packets with lower priority are relegated to being sent when remaining bandwidth permits.

Optionally, a packet distribution scheme may refrain from distributing data through one or more modems due to cost. For example, if sufficient bandwidth is available from cheaper to operate modems (e.g., 3G) then other more costly to operate modems (e.g., satellite) are not used. When appropriate, dictated at least in part by link characteristics, more costly modems can be used to transfer higher priority data. For example, if all the 3G modems in a vehicle are out of range of a cell tower, a satellite modem can be used to send telemetry and receive vehicle commands until 3G service is again available.

Thus, in general, mobile device 101 can control the routing of data, audio, and video between control device 121 and other systems co-located with mobile device 101 (e.g., at, integrated with, and/or attached to the same vehicle). Mobile device 101 can give data types related to monitoring specified (e.g., vehicle) systems and/or controlling specified (e.g., vehicle) systems higher priority. Some telemetry data may be designated to have higher priority relative to other telemetry data. For example, telemetry data indicating a low engine battery can be given a higher priority than telemetry data indicating temperature. Similarly, some types of commands may be designated have higher priority over other types of commands. For example, a command to electrically isolate a malfunctioning battery can be given a higher priority than a command for panning or tilting a camera.

Figure 2:
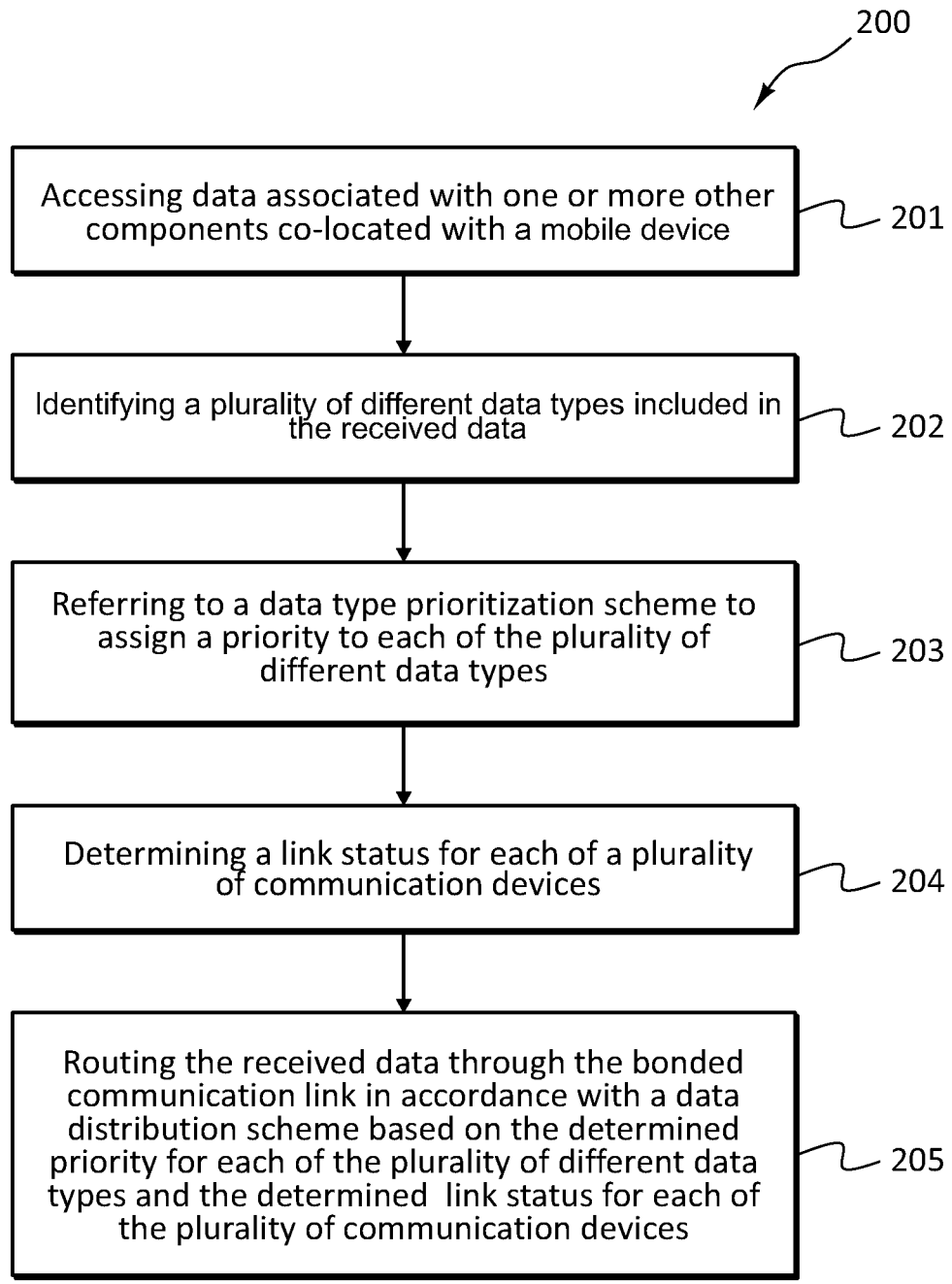
FIG. 2 illustrates a flow chart of an example method for prioritized transmission of different data types over bonded communication modules.

FIG. 2 illustrates a flow chart of an example method 200 for prioritized transmission of different data types over bonded communication modules. Method 200 will be described with respect to the components and data of computer architecture 100.

Method 200 includes accessing data associated with one or more other components co-located with a mobile device (201). For example, mobile device 101 can access any of analog video 116, digital video 117, data 118, configuration 119, and data 120.

Method 200 includes identifying a plurality of different data types included in the received data (202). For example, packet inspector and prioritizer 105 can identify data types for any of: analog video 116, digital video 117, data 118, configuration 119, and data 120. Method 200 includes referring to a data type prioritization scheme to assign a priority to each of the plurality of different data types (203). For example, packet inspector and prioritizer 105 can refer to a data type prioritization scheme to assign a priority to any of: analog video 116, digital video 117, data 118, configuration 119, and data 120.

Method 200 includes determining a link status for each of a plurality of communication devices (204). For example, network link monitor can determine a link status for each of modems 111-115.

Method 200 includes routing the received data through the bonded communication link in accordance with a data distribution scheme based on the determined priority for each of the plurality of different data types and the determined link status for each of the plurality of communication devices (205). For example, packet distributor 102 can route any of: analog video 116, digital video 117, data 118, configuration 119, and data 120 to control device 121 in accordance with a data distribution scheme. The routing can be based on the determined priority for each of: analog video 116, digital video 117, data 118, configuration 119, and data 120 and the determined link status for each of modems 111-115.

In some aspects, audio and video have a lower priority than other types of data (video can have a lower priority than audio or vice versa). The other data types can be designated to have higher or lower priority relative to one another. Data type designations can be made by a vehicle owner, a vehicle operator (e.g., pilot), set by standards or regulations, etc. For UAVs, higher priority can be given to data related to the air worthiness of the UAV.

Control device 121 can be software running on a personal computer.

In some aspects, data is prioritized based on an associated input or output port. Thus, mobile device 101 could prioritize based on data stream. For example, mobile device 101 could prioritize zero or more digital inputs and/or zero or more analog inputs.

Control device 121 can be at a fixed location or can be mobile. For example, control device 121 can be in a mobile command center (e.g., a land based vehicle). When control device 121 is mobile, control device 121 can also include a plurality of modems bonded into a bonded link (e.g., replacing port 122). In some embodiments, depending on available communication modules, mobile device 101 is at, integrated with, and/or attached to a UAV and control device 121 is at, integrated with, and/or attached to another aircraft. The other aircraft can be another UAV. As such, one UAV can serve as a relay between another UAV and a ground station or other control center.

Modems in a bonded link (either in mobile device 101 or control device 121) can be of the same or different brands, types, capabilities, etc. For example, a bonded link can include any of 3G cellular, 4G cellular, satellite, Wi-Fi, WiMAX, etc., modems or interface cards. In some embodiments, operating costs can be balanced against reliability. A bonded link can include a number of cheaper to operate modems (e.g., 3G) along with other more costly to operate modems (e.g., satellite). The more costly to operate modems can be used when the cheaper to operate modems fail to provide sufficient bandwidth for safely operating a vehicle.

Aspects of invention can be used to prioritize the routing of video, audio, and data to and from vehicles. The vehicles can be a land based, aerial (fixed wing and/or rotary), marine based (submersible or non-submersible), or space based vehicles. Vehicles can have a vehicle operator (either in the vehicle or operating the vehicle remotely). In one aspect, a vehicle is a Remotely Piloted Aircraft (RPA).

Vehicles can include computer network connectivity components (e.g., a Network Interface Card ("NIC") or cellular modem) for wired or wirelessly connecting the cameras, condensers and other vehicle components to a computer network. As such, modules, algorithms, components, etc., for routing prioritized data, audio and video through a bonded link can also be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., for routing prioritized data, audio and video through a bonded link as well as any other connected computer systems and their components (e.g., in a control or command center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

As such, modules, algorithms, components, etc., for routing prioritized data, audio and video through a bonded link can be operated (e.g., remotely) over the computer network. When a control system (e.g., control device 121) is used to control a vehicle (whether the vehicle is manned or unmanned), the control system can also be used to control routing prioritized data, audio and video at a vehicle through a bonded link.

In some aspects, routing prioritized data, audio, and video through a bonded link is provided though autonomous operation by a robotic vehicle or system. For example, a robotic vehicle or system can route prioritized data, audio and video through a bonded link.

Aspects of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, the method comprising
identifying airworthiness data indicative of the airworthiness of an Unmanned Aerial Vehicle (UAV);
identifying another type of data;
assigning a higher priority to the airworthiness data relative to a lower priority assigned to the other type of data;
monitoring a first link quality of a first communication link and monitoring a second link quality of second communication link, the first communication link and the second communication link bonded together in a bonded communication link;
selecting the first communication link and the second communication link to transfer the data based on:
the first link quality and the second link quality, and
at least one of: the higher priority or the lower priority; and
routing the data through the bonded communication link based on the first link quality, the second link quality, the higher priority, and the lower priority, including:
determining that that second communication link is degraded relative to the first communication link based on the first link quality and the second link quality;
routing the airworthiness data via the first communication link based at least in part on the assigned higher priority; and
routing the other type of data via the second communication link.

2. The method of claim 1, wherein routing the data through the bonded communication link comprises routing the data through the bonded communication link in accordance with a data distribution scheme.

3. The method of claim 1, further comprising monitoring a third link quality of a third communication link, the third communication link bonded together along with the first communication link and the second communication link in the bonded communication link; and
wherein routing the data through the bonded communication link comprises refraining from routing any of the data over the third communication link based at least in part on the third link quality.

4. The method of claim 1, wherein routing the other type of data via the second communication link comprises routing the other type of data via the second communication link essentially simultaneously with routing data the airworthiness data via the first communication link.

5. The method of claim 1, wherein identifying another type of data comprises identifying a data type selected from among: video data, audio data, telemetry data, and command data.

6. The method of claim 1, wherein identifying airworthiness data comprises identifying one of:
airworthiness telemetry data or airworthiness command data.

7. The method of claim 1, wherein routing the airworthiness data via the first communication link comprises routing the airworthiness data over a satellite communication link; and
wherein routing data of the other type of data via the second communication link comprises routing the other type of data over a cellular communication link.

8. A method, the method comprising
monitoring the link quality of each of a plurality of communication links bonded together in a bonded communication link, including:
monitoring a first link quality of a first communication link; and
monitoring a second link quality of a second communication link;
selecting the first communication link and the second communication link to transfer data based on:
the monitored link qualities for each of the plurality of communication links, and
at least one of: a higher priority assigned to airworthiness data associated with a Remotely Piloted Aircraft (RPA) or a lower priority assigned to another type of data; and
routing the airworthiness data and the other type of data through the bonded communication link based at least on: the first link quality, the second link quality, the higher priority, and the lower priority, including:
determining that that second communication link is degraded relative to the first communication link based on the first link quality and the second link quality;
routing the airworthiness data via the first communication link based at least in part on the assigned higher priority; and
routing the other type of data via the second communication link.

9. The method as recited in claim 8, wherein routing the airworthiness data and the other type of data through the bonded communication link comprises routing the airworthiness data and the other type of data through the bonded communication link in accordance with a data distribution scheme.

10. The method of claim 8, wherein monitoring the link quality of each of a plurality of communication links bonded together in a bonded communication link comprises monitoring a third link quality of a third communication link; and
wherein routing the other type of data via the second communication link comprises adjusting from routing the other type of data via the third communication link to routing the other type of data via the second communication link based at least in part on the third link quality.

11. The method of claim 8, wherein routing the airworthiness data and the other type of data through the bonded communication link comprises routing at least one of: power data, engine data, or environmental data associated with the Remotely Piloted Aircraft (RPA).

12. The method of claim 8,
wherein routing the other type of data via the second communication link comprises routing one of: video data or audio data via the second communication link based at least in part on the assigned lower priority.

13. The method of claim 8, wherein routing the airworthiness data via the first communication link comprises routing the airworthiness data via a WiMAX communication link; and
wherein routing the other type of data via the second communication link comprises routing the other type of data via a cellular communication link.

14. The method of claim 8, wherein routing the airworthiness data via the first communication link comprises routing the airworthiness data via a first cellular communication link; and
wherein routing the other type of data via the second communication link comprises routing the other type of data via a second cellular communication link.

15. A device, the device comprising:
a processor;
a bonded communication link bonding together the capabilities from each of a plurality of other communication links, the bonded communication link forming a higher bandwidth communication link relative to each of the plurality of other communication links;
system memory coupled to the processor and storing instructions configured to cause the processor to:
monitor the link quality of each of a plurality of other communication links, including:
monitor a first link quality of a first communication link; and
monitor a second link quality of a second communication link
assign a first priority to airworthiness data associated with a Remotely Piloted Aircraft (RPA), the first priority being a higher priority relative to a second priority;
assign the second priority to another type of data;
select the first communication link and the second communication link to transfer data based on:
the first link quality and the second link quality, and
at least one of: the first priority and the second priority; and
route the airworthiness data and the other type of data through bonded communication link based on the first link quality, the second link quality, the first priority, and the second priority, including:
determine that that second communication link is degraded relative to the first communication link based on the first link quality and the second link quality;
route the airworthiness data via the first communication link; and
route the other type of data via the second communication link.

16. The device of claim 15, wherein the instructions configured to cause the processor to monitor the link quality of each of a plurality of communication links comprise the instructions configured to cause the processor to monitor a third link quality of a third communication link; and
wherein the instructions configured to cause the processor to route the other type of data via the second communication link comprise the instructions configured to cause the processor to adjust from routing the other type of data via the third communication link to routing the other type of data via the second communication link based at least in part on the third link quality.

17. The device of claim 15, further comprising the instructions configured to cause the processor to refrain from routing even lower priority data via the second communication link to free up the second communication link for routing the other type of data.

* * * * *